(12) United States Patent
Dong et al.

(10) Patent No.: US 12,051,263 B2
(45) Date of Patent: Jul. 30, 2024

(54) HUMAN LYING POSTURE DETECTION METHOD AND MOBILE MACHINE USING THE SAME

(71) Applicants: Futronics (NA) Corporation, Pasadena, CA (US); UBTECH ROBOTICS CORP LTD, Shenzhen (CN)

(72) Inventors: Chuqiao Dong, Pasadena, CA (US); Dan Shao, San Gabriel, CA (US); Zhen Xiu, Chino Hills, CA (US); Dejun Guo, San Gabriel, CA (US); Huan Tan, Pasadena, CA (US)

(73) Assignees: FUTRONICS (NA) CORPORATION, Pasadena, CA (US); UBTECH ROBOTICS CORP LTD, Shenzhen (CN)

( * ) Notice: Subject to any disclaimer, the term of this patent is extended or adjusted under 35 U.S.C. 154(b) by 437 days.

(21) Appl. No.: 17/364,806

(22) Filed: Jun. 30, 2021

(65) Prior Publication Data

US 2023/0004740 A1     Jan. 5, 2023

(51) Int. Cl.
G06T 7/11     (2017.01)
G06T 7/187    (2017.01)
G06T 7/40     (2017.01)
G06T 7/73     (2017.01)
(Continued)

(52) U.S. Cl.
CPC .............. *G06V 40/103* (2022.01); *G06T 7/11* (2017.01); *G06T 7/40* (2013.01); *G06T 7/73* (2017.01); *G06T 2207/10028* (2013.01)

(58) Field of Classification Search
CPC ........... G06V 40/103; G06T 7/11; G06T 7/40; G06T 7/73; G06T 2207/10028
See application file for complete search history.

(56) References Cited

U.S. PATENT DOCUMENTS 6,697,502 B2 *   2/2004   Luo .......................... G06T 7/40
                                                                382/164
10,229,491 B1 *  3/2019   Rush ........................ G06T 7/73
(Continued)

FOREIGN PATENT DOCUMENTS

CN      112861624 A  *  5/2021
WO   WO-2019206239 A1 *  10/2019  ......... G06K 9/00342

OTHER PUBLICATIONS

ISR for PCT/CN2022/079332.
Written opinions of ISA for PCT/CN2022/079332.

*Primary Examiner* — Bobbak Safaipour
*Assistant Examiner* — Ashley L. Hytrek

(57) ABSTRACT

Human lying posture detections are disclosed. A human lying on a bed is detected by obtaining an image through a depth camera, detecting objects in the image and marking the objects in the image using 2D bounding boxes by deep learning, determining the human being in a lying posture in response to a width and a height of the 2D bounding box of the human meeting a predetermined condition, detecting one or more skin areas in the image and generating skin area 2D bounding boxes to mark each of the one or more skin areas using a skin detection algorithm, and determining the human being in the lying posture in response to the skin area 2D bounding boxes and the 2D bounding box of the bed meeting a predetermined positional relationship.

20 Claims, 10 Drawing Sheets

(51) Int. Cl.
*G06V 10/764* (2022.01)
*G06V 40/10* (2022.01)

(56) References Cited

U.S. PATENT DOCUMENTS

2019/0012531 A1* 1/2019 Radwin ................ G06T 7/251
2020/0265602 A1* 8/2020 Ostadabbas .......... G06V 40/103

* cited by examiner

HUMAN LYING POSTURE DETECTION METHOD AND MOBILE MACHINE USING THE SAME

BACKGROUND

1. Technical Field

The present disclosure relates to human lying posture detections, and particularly to a human lying posture detection method and a mobile machine using the same.

2. Description of Related Art

In healthcare industry, with the help of flourishing artificial intelligence (AI) techniques, robots already have many kinds of applications including mobility aid robots and medical robots. The mobility aid robots are often designed as devices like wheelchairs or walkers to assist walking and otherwise so as to improve the mobility of people with a mobility impairment.

For realizing the functions like walking aids, a mobility aid robot is inevitable to have automatic navigation capability so as to assist the user in a more automatic and convenient way. And for realizing automatic navigation, it needs to detect its user for path planning, and even need to detect the user's posture so as to serve in a more appropriate manner accordingly.

Skeleton-based posture detection is a popular technique for realizing human posture detection in robots, which detects the posture of a human according to the identified key points on an estimated skeleton of the human. In the case that there have enough identified key points, it will be effective and can detect accurately; otherwise, in the case that the key points can be identified are not enough because, for example, the body of the human is highly occluded by obstacles or cloths, it may even impossible to be realized. Especially when the human lies down in a bed and covered with a quilt, the quilt and even the bed may occlude the body and affect the effect of detection. Therefore, a method to detect human lying posture which is independent with the skeleton-based posture detection is need.

BRIEF DESCRIPTION OF THE DRAWINGS

In order to more clearly illustrate the technical solutions in this embodiment, the drawings used in the embodiments or the description of the prior art will be briefly introduced below. In the drawing(s), like reference numerals designate corresponding parts throughout the figures. It should be understood that, the drawings in the following description are only examples of the present disclosure. For those skilled in the art, other drawings can be obtained based on these drawings without creative works.

DETAILED DESCRIPTION

Figure 1A:
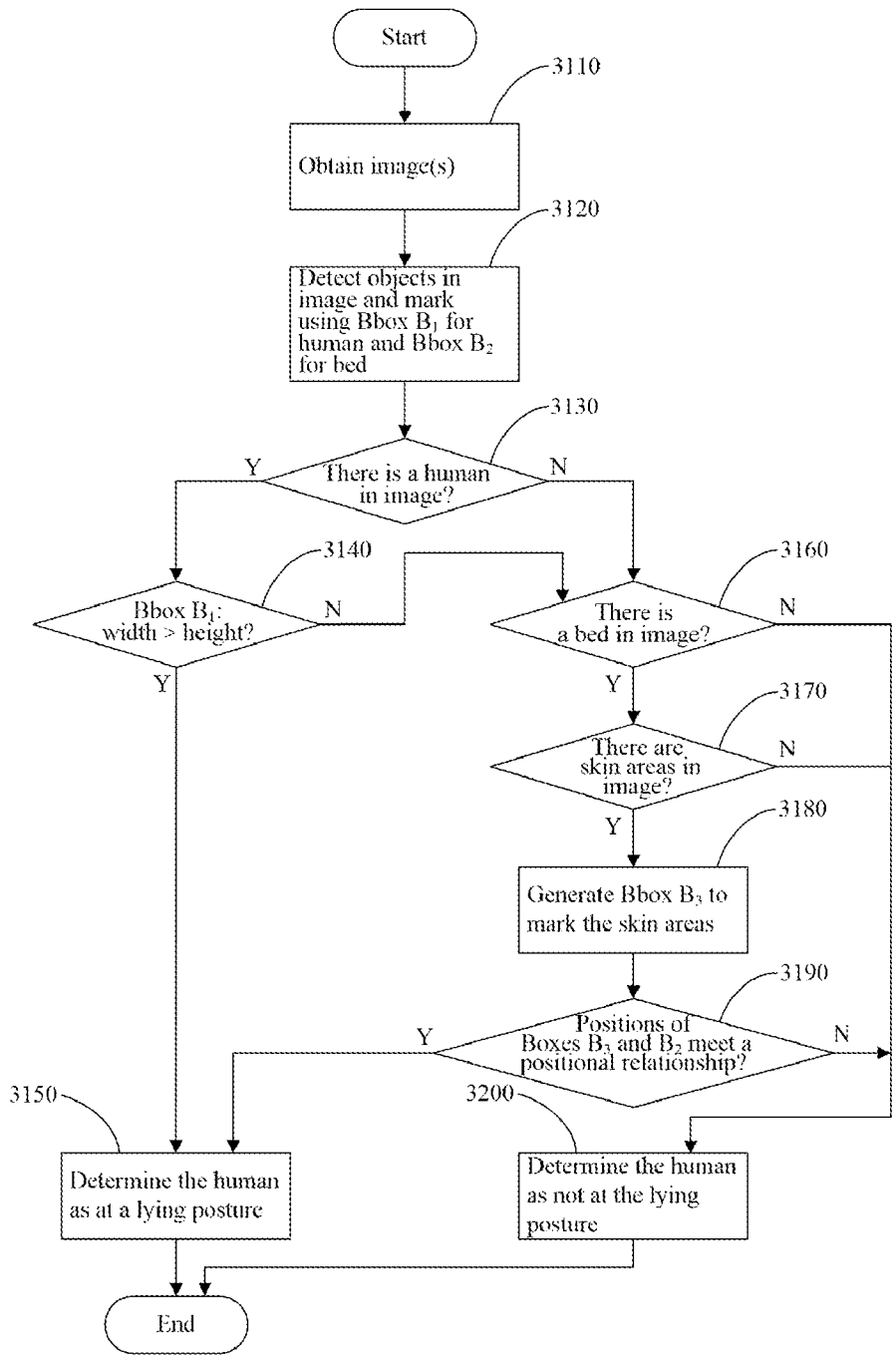
FIG. 1A is a flow chart of a human l vino posture detection method for a mobile machine according to some embodiments of the present disclosure.

In order to make the objects, features and advantages of the present disclosure more obvious and easy to understand, the technical solutions in this embodiment will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including", "comprising", "having" and their variations indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one". "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

In the present disclosure, the terms "first", "second", and "third" are for descriptive purposes only, and are not to be comprehended as indicating or implying the relative importance or implicitly indicating the amount of technical features indicated. Thus, the feature limited by "first", "second", and "third" may include at least one of the feature either explicitly or implicitly. In the description of the present disclosure, the meaning of "a plurality" is at least two, for example, two, three, and the like, unless specifically defined otherwise.

In the present disclosure, the descriptions of "one embodiment", "some embodiments" or the like described in the specification mean that one or more embodiments of the present disclosure can include particular features, structures, or characteristics which are related to the descriptions of the descripted embodiments. Therefore, the sentences "in one embodiment". "in some embodiments", "in other embodiments", "in other embodiments" and the like that appear in different places of the specification do not mean that descripted embodiments should be referred by all other embodiments, but instead be referred by "one or more but not all other embodiments" unless otherwise specifically emphasized.

The present disclosure relates to mobile machine navigating. As used herein, the term "human" refers to the most populous and widespread species of primates in the earth. A human has a body including a head, a neck, a trunk, arms, hands, legs and feet. The term "posture" refers to a human position such as standing, sitting, and lying, and the term "lying posture" refers to a kind of human position in which the body is supported along its length by the surface underneath. The term "bed" refers to an object, which may be raised and allows a human to rest on. A bed may include typical objects such as pillows and blankets on there. The bed may also be, for example, a couch, a bench, and hammock. The term "detection" refers to a computer technology related to computer vision and image processing that deals with detecting instances of semantic objects of a certain class (e.g., humans and furniture) in digital images. The term "mobile machine" refers to a machine such as a mobile robot or a vehicle that has the capability to move around in its environment. The term "trajectory planning" refers to find a sequence of valid configurations that moves a mobile machine from the source to the destination and is parametrized by time, where "trajectory" denotes a sequence of poses with time stamp (cf. "path" denotes a sequence of poses or position without time stamp). The term "pose" refers to position (e.g., x and y coordinates on x and y axes) and posture (e.g., a yaw angle along z axis). The term "navigation" refers to the process of monitoring and controlling the movement of a mobile robot from one place to another, and the term "collision avoidance" refers to prevent or reduce the severity of a collision. The term "sensor" refers to a device, module, machine, or subsystem such as ambient light sensor and image sensor (e.g., camera) whose purpose is to detect events or changes in its environment and send the information to other electronics (e.g., processor).

Figure 1B:
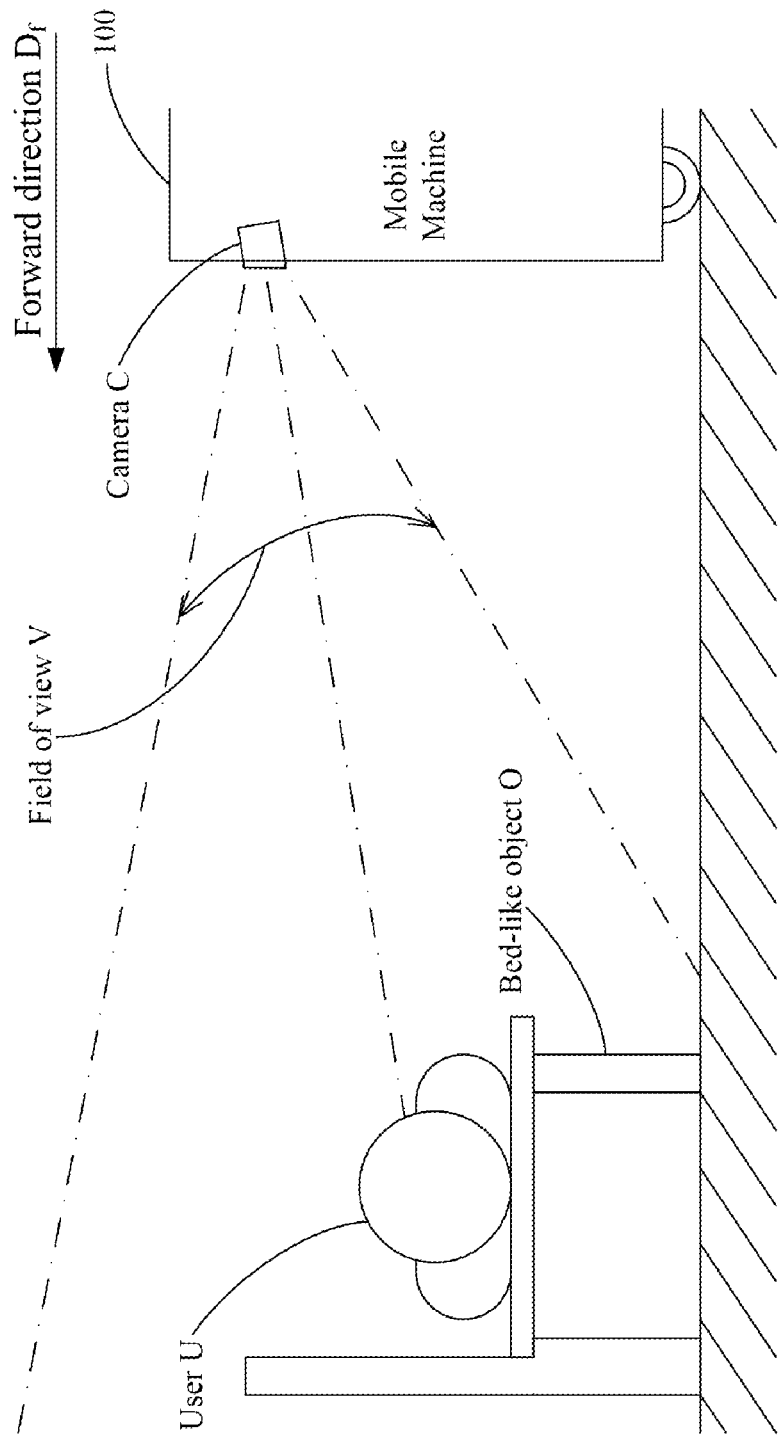
FIG. 1B is a schematic diagram of using a camera of the mobile machine of FIG. 1A to detect the posture of a human.

FIG. 1A is a flow chart of a human lying posture detection method for a mobile machine 100 (see FIG. 1B) according to some embodiments of the present disclosure, and FIG. 1B is a chematic diagram of using a camera C of the mobile machine 100 of FIG. 1A to detect the posture of a human. As shown in FIG. 1A and FIG. 1B, the mobile machine 100 that is navigated in its environment (e.g., a room) detects the posture of the human, that is, a user U on a bed O. The bed O may be a furniture (e.g, a bench). The mobile machine 100 is a mobile robot (e.g,, a mobility aid robot), which includes the camera C and wheels E (not shown). The camera. C may he disposed toward a forward direction $D_r$ which the mobile machine 100 straightly moves such that lens of the camera C straightly face toward the forward direction $D_r$. The camera C has a camera coordinate system, and the coordinates of the mobile machine 100 are consistent with the coordinates of the camera C. in the camera coordinate system, the x-axis is consistent with the forward direction $D_r$, the y-axis is parallel to the horizon, and the z-axis is perpendicular to the horizon. A field of view V of the camera C covers both the user U and the bed O. The height (e.g., 1 meter) of the camera C on the mobile machine 100 may be changed according to actual needs (e.g., larger height to have the larger field of view V and smaller height to have the smaller field of view V), and the pitch angle of the camera C with respect to the floor may also be changed according to actual needs (e g., larger pitch angle to have the nearer field of view V and smaller pitch angle to have the Parer field of view V). Based on the height and the pitch angle of the camera C, a relative position of the user U near the mobile machine 100 can be obtained, and whether the user U is lying down or the bed O at which the user U is lying can also be determined. It should be noted that, the mobile machine 100 is only one example of mobile machine, and the mobile machine 100 may have more, fewer, or different parts than shown in above or below (e.g., have legs rather than the wheels E), or may have a different configuration or arrangement of the parts (e.g., have the camera C dispose on the top of the mobile machine 100), In other embodiments, the mobility machine 100 may be another kind of mobile machine such as a vehicle In some embodiments, the mobile machine 100 is navigated in the environment while dangerous situations such as collisions and unsafe conditions (e.g., falling, extreme temperature, radiation, and exposure) may be prevented. In this indoor navigation, the mobile machine 100 is navigated from a starting point (e.g., the location where the mobile machine 100 originally locates) to a destination (e.g., the location of the goal of navigation which is indicated by the user U or the navigation/operation system of the mobile machine 100), and obstacles (e.g., walls, furniture, humans, pets, and garbage) may be avoided so as to prevent the above-mentioned dangerous situations. The trajectory (e.g., trajectory T, not shown) for the mobile machine 100 to move from the starting point to the destination has to be planned so as to move the mobile machine 100 according to the trajectory. The trajectory includes a sequence of poses (e.g., poses $S_{n-1}$-$S_n$ trajectory T, not shown). It should be noted that, the starting point and the destination only refer to the locations of the mobile machine 100, rather than the real beginning and end of the trajectory (the real beginning and end of a trajectory should be a pose, respectively). In some embodiments, for realizing the navigation of the mobile machine 100, the map for the environment has to be built, the current position of the mobile machine 100 in the environment may have to be determined (using, for example, the IMU 1331), and trajectories may be planned based on the built map and the determined current position of the mobile machine 100. The desired pose $S_d$ (not shown) is the last of the sequence of poses S (not shown) in a trajectory T, that is, the end of the trajectory T. The trajectory T is planned according to, for example, a shortest path in the built map to the user U. In addition, the collision avoidance to obstacles in the built map (e.g., walls and furniture) or that detected in real time (e.g., humans and pets) may also be considered when planning, so as to accurately and safely navigate the mobile machine 100.

In some embodiments, the navigation of the mobile machine 100 may be actuated through the mobile machine 100 itself (e.g., a control interface on the mobile machine 100) or a control device such as a remote control, a smart phone, a tablet computer, a notebook computer, a desktop computer, or other electronic device by, for example, providing a request for the navigation of the mobile machine 100. The mobile machine 100 and the control device may communicate over a network which may include, for example, the Internet, intranet, extranet, local area network (LAN), wide area network (WAN), wired network, wireless networks (e.g., Wi-Fi network, Bluetooth network, and mobile network), or other suitable networks, or any combination of two or more such networks.

Figure 2:
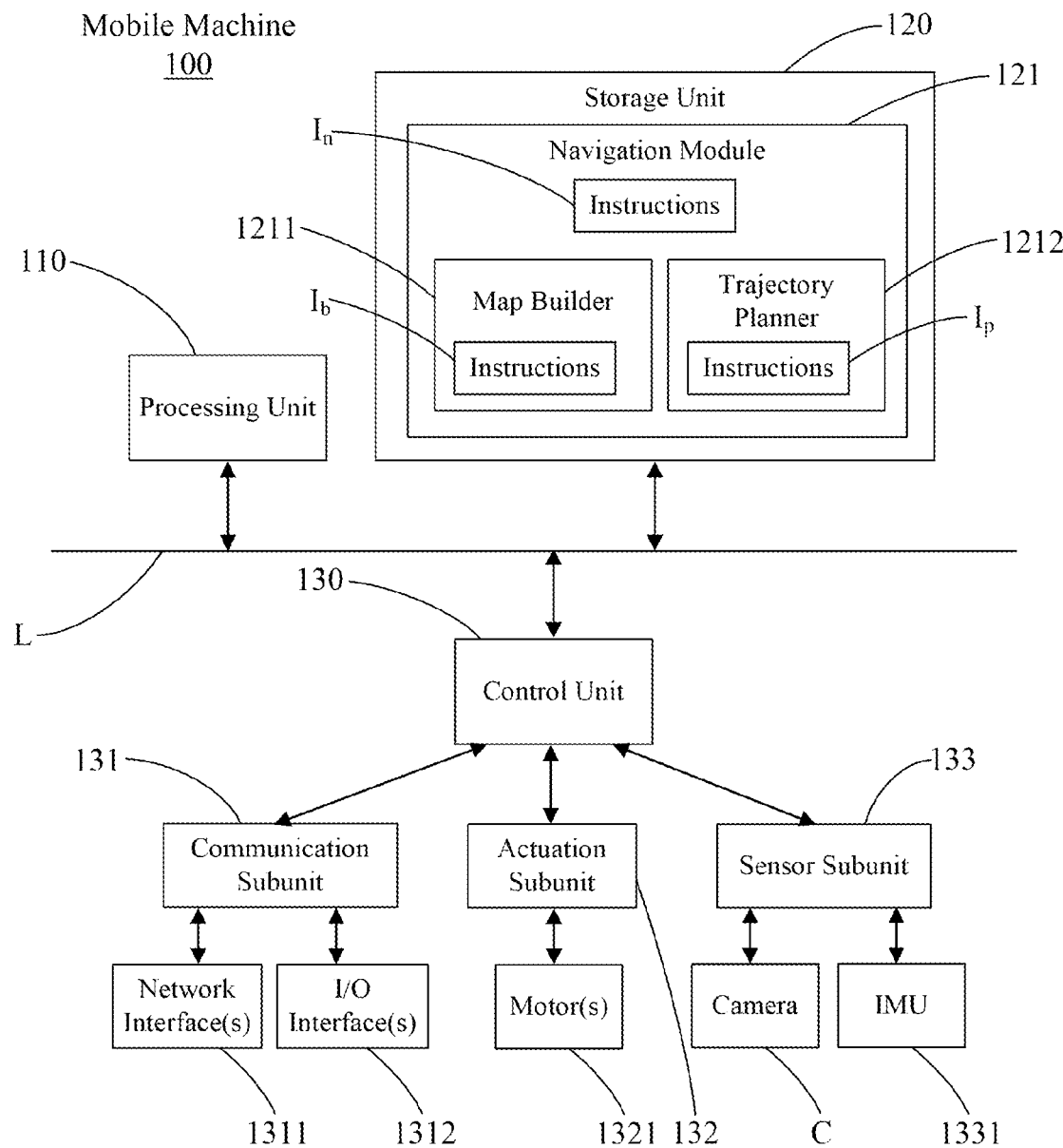
FIG. 2 is a schematic block diagram illustrating the mobile machine of FIG. 1A.

FIG. 2 is a schematic block diagram illustrating the mobile machine of FIG. 1A. The mobile machine 100 may include a processing unit 110, a storage unit 120, and a control unit 130 that communicate over one or more communication buses or signal lines L. It should be noted that, the mobile machine 100 is only one example of mobile machine, and the mobile machine 100 may have more or fewer components (e.g., unit, subunits, and modules) than shown in above or below, may combine two or more components, or may have a different configuration or arrangement of the components. The processing unit 110 executes various (sets ot) instructions stored in the storage unit 120 that may be in form of software programs to perform various functions for the mobile machine 100 and to process related data, which may include one or more processors (e.g., CPU). The storage unit 120 may include one or more memories (e.g., high-speed random access memory (RAM) and non-transitory memory), one or more memory controllers, and one or more non-transitory computer readable storage media (e.g., solid-state drive (SSD) or hard disk drive). The control unit 130 may include various controllers (e.g., camera controller, display controller, and physical button controller) and peripherals interface for coupling the input and output peripheral of the mobile machine 100, for example, external port (e.g., USB), wireless communication circuit (e.g., RF communication circuit), audio circuit (e.g., speaker circuit), sensor (e.g., inertial measurement unit (IMU)), and the like, to the processing unit 110 and the storage unit 120. In some embodiments, the storage unit 120 may include a navigation module 121 for implementing navigation functions (e.g., map building and trajectory planning) related to the navigation (and trajectory planning) of the mobile machine 100, which may be stored in the one or more memories (and the one or more non-transitory computer readable storage media).

The navigation module 121 in the storage unit 120 of the mobile machine 100 may be a software module (of the operation stem of the mobile machine 100), which has instructions $I_n$ (e.g., instructions for actuating motor(s) 1321 of the wheels E of the mobile machine 100 to move the mobile machine 100) for implementing the navigation of the mobile machine 100, a map builder 1211, and trajectory planner(s) 1212. The map builder 1211 may be a software module having instructions $I_b$ for building map for the mobile machine 100. The trajectory planner(s) 1212 may be software module(s) having. instructions $I_p$ for planning trajectories for the mobile machine 100. The trajectory planner(s) 1212 may include a global trajectory planner for planning global trajectories (e.g., trajectory T) for the mobile machine 100 and a local trajectory planner for planning local trajectories for the mobile machine 100. The global trajectory planner may be, for example, a trajectory planner based on Dijkstra's algorithm, which plans global trajectories based on map(s) built by the map builder 1211 through, for example, simultaneous localization and mapping (SLAM). The local trajectory planner may be, for example, a trajectory planner based on TEB (timed elastic band) algorithm, which plans local trajectories based on the global trajectory, and other data collected by the mobile machine 100. For example, images may be collected through the camera C of the mobile machine 100, and the collected images may be analyzed so as to identify obstacles, so that the local trajectory can be planned with reference to the identified obstacles, and the obstacles can be avoided by moving the mobile machine 100 according to the planned local trajectory.

Each of the map builder 1211 and the trajectory planner(s) 1212 may be a submodule separated from the instructions $I_n$ or other submodules of the navigation module 121, or a part of the instructions $I_n$ for implementing the navigation of the mobile machine 100. The trajectory planner(s) 1212 may further have data (e.g., input/output data and temporary data) related to the trajectory planning of the mobile machine 100 which may be stored in the one or more memories and accessed by the processing unit 110. In some embodiments, each of the trajectory planner(s) 1212 may be a module in the storage unit 120 that is separated from the navigation module 121.

In some embodiments, the instructions $I_n$ may include instructions for implementing collision avoidance of the mobile machine 100 (e.g., obstacle detection and trajectory replanning). In addition, the global trajectory planner may replan the global trajectory(s) (i.e., plan new global trajectory(s)) to detour in response to, for example, the original global trajectory(s) being blocked (e.g., blocked by an unexpected obstacle) or inadequate for collision avoidance (e.g., impossible to avoid a detected obstacle when adopted). In other embodiments, the navigation module 121 may be a navigation unit communicating with the processing unit 110, the storage unit 120, and the control unit 130 over the one or more communication buses or signal lines L and may further include one or more memories (e.g., high-speed random access memory (RAM) and non-transitory memory) for storing the instructions $I_n$, the map builder 1211, and the trajectory planner(s) 1212, and one or more processors (e.g., MPU and MCU) for executing the stored instructions $I_n$, $I_b$ and $I_p$ to implement the navigation of the mobile machine 100.

The mobile machine 100 may further include a communication subunit 131 and an actuation subunit 132. The communication subunit 131 and the actuation subunit 132 communicate with the control unit 130 over one or more communication buses or signal lines that may be the same or at least partially different from the above-mentioned one or more communication buses or signal lines L. The communication subunit 131 is coupled to communication interfaces of the mobile machine 100, for example, network interface(s) 1311 for the mobile machine 100 to communicate with the control device via the network, I/O interface(s) 1312 (e.g., a physical button), and the like. The actuation subunit 132 is coupled to component(s)/device(s) for implementing the motions of the mobile machine 100 by, for example, actuating motor(s) 1321 of the wheels E and/or joints of the mobile machine 100. The communication subunit 131 may include controllers for the above-mentioned communication interfaces of the mobile machine 100, and the actuation subunit 132 may include controller(s) for the above-mentioned component(s)/device(s) for implementing the motions of the mobile machine 100. In other embodiments, the communication subunit 131 and/or actuation subunit 132 may just abstract component for representing the logical relationships between the components of the mobile machine 100.

The mobile machine 100 may further include a sensor subunit 133 which may include a set of sensor(s) and related controller(s), for example, the camera C, and an IMU 1331 (or an accelerometer and a gyroscope), for detecting the environment in which it is located to realize its navigation. The camera C is a depth camera such as an RGB-D camera. The sensor subunit 133 communicates with the control unit 130 over one or more communication buses or signal lines that may be the same or at least partially different from the above-mentioned one or more communication buses or signal lines L. In other embodiments, in the case that the navigation module 121 is the above-mentioned navigation unit, the sensor subunit 133 may communicate with the navigation unit over one or more communication buses or signal lines that may be the same or at least partially different from the above-mentioned one or more communication buses or signal lines L. In addition, the sensor subunit 133 may just abstract component for representing the logical relationships between the components of the mobile machine 100.

In some embodiments, the map builder 1211, the trajectory planner(s) 1212, the sensor subunit 133, and the motor(s) 1321 (and the wheels E and/or joints of the mobile machine 100 coupled to the motor(s) 1321) jointly compose a (navigation) system which implements map building, (global and local) trajectory planning, and motor actuating so as to realize the navigation of the mobile machine 100. In addition, the various components shown in FIG. 2B may be implemented in hardware, software or a combination of both hardware and software. Two or more of the processing unit 110, the storage unit 120, the control unit 130, the navigation module 121, and other units/subunits/modules may be implemented on a single chip or a circuit. In other embodiments, at least a part of them may be implemented on separate chips or circuits.

In some embodiments, the human lying posture detection method maybe implemented in the mobile machine 100 by, for example, storing (sets of) the instructions $I_n$, corresponding, to the human lying posture detection method as the navigation module 121 in the storage unit 120 and executing the stored instructions in through the processing unit 110, and then the mobile machine 100 can detect using the camera C so as to determine whether the user U is lying down or not. The human lying posture detection method may be performed in response to, for example, a request for detecting the posture of the user U from, for example, (The navigation/operation system of) the mobile machine 100 itself or the control device, then it may alsi be re-performed, for example, in every predetermined time interval (e.g., 1 second) to re-determine whether the user U is lying down or not, thereby detecting the change of the posture of the user U. Accordingly, at step 3110, image(s) I may be obtained through the camera C. Since the camera C is a depth camera (eg., an RGB-D camera), the image(s) I captured by the camera C include pixel values that represent distance. A plurality of images I may be obtained so as to select one image 1 (e.g., the image 1 that meets a certain quality for use.

Figure 3:
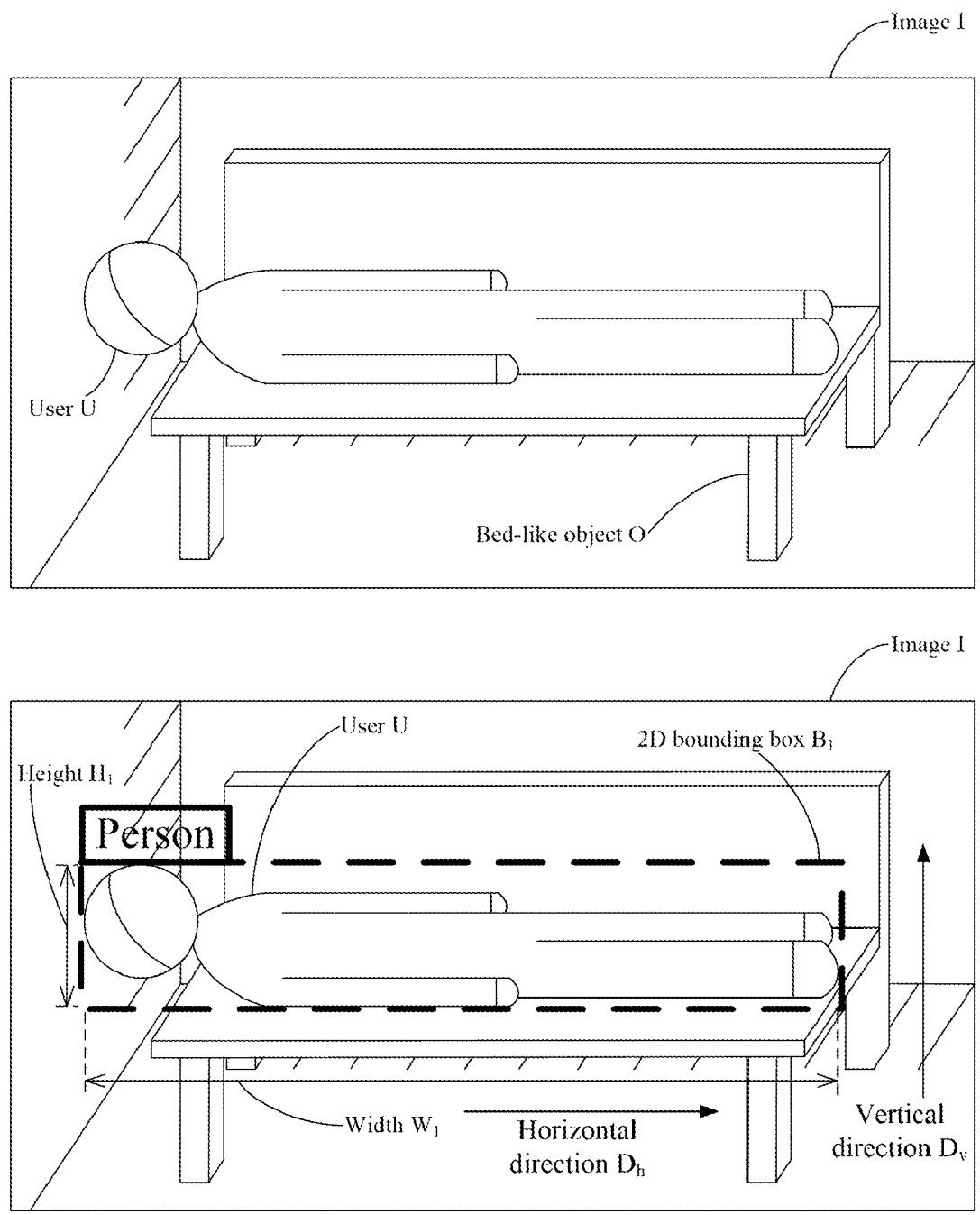
FIG. 3 is a schematic diagram of marking a human in an image captured by the camera of the mobile machine of FIG. 1A.
Figure 4:
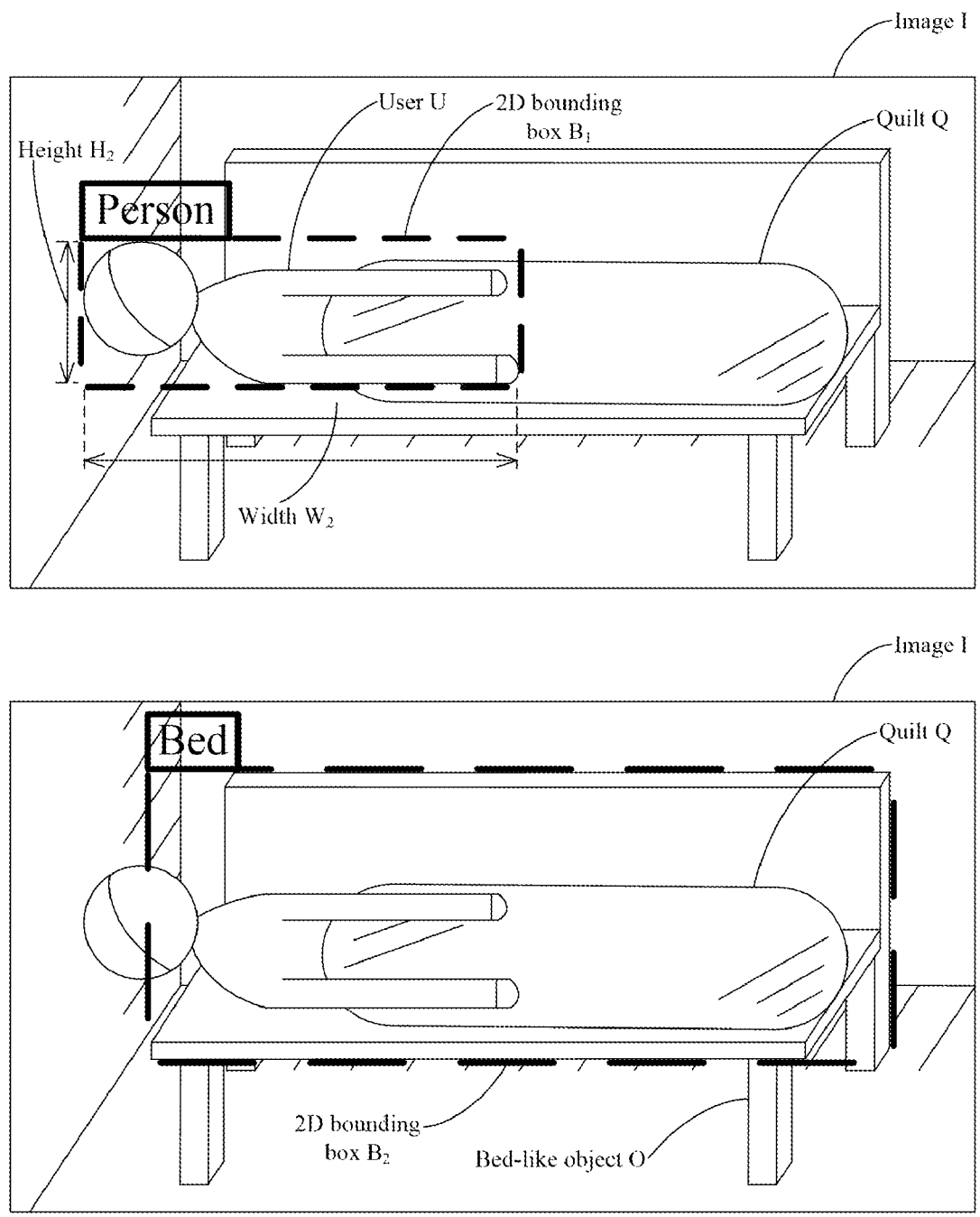
FIG. 4 is a schematic diagram of marking a human and a bed in an image captured by the camera of the mobile machine of FIG. 1A.

At step 3120, objects (e.g., a human and a bed) in the image I are detected and marked using 2D bounding boxes by deep learning. A 2D (two dimensional) bounding box (BBox) $B_1$ of human is generated to mark the human, that is, the user U. and a 2D bounding box $B_2$ of bed is generated to mark the bed O. The 2D bounding box $B_1$ is output by a deep learning model. The deep learning model may be a computer model based on, for example, YOLO (you only look once) algorithm, which may be trained using the labeled data with respect to the detection of human. FIG. 3 is a schematic diagram of marking a human (i.e., the user U) in the image I captured by the camera C of the mobile machine 100 of FIG. 1A. In the image I of the upper part of FIG. 3, the bed O and the user U and lying thereon are included. In the image I of the lower part of FIG. 3, the 2D bounding box $B_1$ is a rectangular area in the image I that is shown as a rectangular box with a dashed line frame to mark the user U. Since the entirety of the body (i.e., a head, a neck, a trunk, two arms, two hands, two legs and two feet) of the user U is shown in the image I, the 2D bounding box $B_1$ marks the entirety of the body of the user U in the image I. In other embodiments, the 2D bounding box $B_1$ may be an area of another shape (e.g., an irregular shape which fits the user U) in the image I that is shown as a box of another shape (e.g., an irregular shape which fits the user U) with a frame of other form (e.g., solid line frame). The 2D bounding box $B_2$ for bed may be output by the above-mentioned deep learning model that is further trained based on the algorithm of YOLO using the labeled data with respect to the detection of bed. In other embodiment, the 2D bounding box $B_2$ for bed may be output by another deep learning model. FIG. 4 is a schematic diagram of marking a human (i.e., the user U) and a bed (i.e., the bed O) in the image I captured by the camera C of the mobile machine 100 of FIG. 1A. In the image I of the upper part of FIG. 4, since a quilt Q is covered on the body of the user U, only a part of the body (i.e., the head, the neck, a part of the trunk, the two arms, and the two hands) of the user U is shown in the image I, and the 2D bounding box $B_2$ of bed only marks the part of the body of the user U in the image I.

At step 3130, a determination is made whether or not there is a user U in the image I. The user U in the image I is detected using the above-mentioned deep learning model. The deep learning model is trained by using a large set of labeled data with respect to the detection of human (e.g., a data set of more than 10,000 images of humans in various scenes), and neural network architectures that contain a plurality of layers, so as to learn to perform classification tasks directly from the inputted image I, thereby detecting the user U in the image I. If it is determined that there is a user U in the image I, step 3140 will be performed; otherwise, step 3160 will be performed.

At step 3140, a determination is made whether or not a width of the 2D bounding box $B_1$ and a height of the 2D bounding box $B_1$ meet the predetermined condition. The predetermined condition may be that the ratio of the width to the height greater than a predetermined ratio (e.g., 5:1), which represents that the width is greater than the height for more than predetermined times (e.g., 5 times). If it is determined that the width and the height of the 2D bounding box $B_1$ meet the predetermined condition (i.e., the width of the 2D bounding box $B_1$ is greater than the height of the 2D bounding box $B_1$ for more than the predetermined times), step 3150 will be performed; otherwise, step 3160 will be performed. For instance, in the case that the predetermined condition is the ratio of 5:1, in the image I of the lower part of FIG. 3, because the width $W_1$ of the 2D bounding box $B_1$ is greater than the height $H_1$ of the 2D bounding box $B_1$ for more than 5 times, it will determine that the width and the height of the 2D bounding box $B_1$ meet the predetermined condition. As shown in FIG. 4, because the width $W_2$ of the 2D bounding box $B_2$ of bed is greater than the height $H_2$ of the 2D bounding box $B_2$ for less than 5 times, it will determine the width $W_2$ and the height $H_2$ of the second 2D bounding box $B_2$ not meet the predetermined condition, hence step 3160 will be performed. In some embodiments, the width of the first 2D bounding box $B_1$ is represented by an eigen vector of the first 2D bounding box $B_1$ in a horizontal direction DX, and the height of the first 2D bounding box $B_1$ is represented by another eigen vector of the first 2D bounding box $B_1$ in a vertical direction $D_y$. At step 3150, the human (i.e., the user U) is determined as in a lying posture, which means that the user U is lying down.

At step 3160, a determination is made whether or not there is a bed O in the image I. The bed O in the image I is detected using the above-mentioned deep learning model. The deep learning model is trained by using a large set of labeled data with respect to the detection of bed (e.g., a data set of more than 10,000 images of beds in various scenes), and neural network architectures that contain a plurality of layers, so as to learn to perform classification tasks directly from the inputted image I, thereby detecting the bed O in the image I. If it is determined that there is a bed O in the image I, step 3170 will be performed; otherwise, step 3200 will be performed. In the image I of the lower part of FIG. 4, although the entirety of the bed O (i.e., a seat, a back, and legs) of the user U is shown in the image I, for detecting the lying posture of the user U that may be on the bed O in the subsequent step(s) of the human lying posture detection method, the 2D bounding box $B_2$ may only mark an upper part (i.e., the seat and the back) of the bed O in the image I. The 2D bounding box $B_2$ is a rectangular area in the image I that is shown as a rectangular box with a dashed line frame to mark the user U. In other embodiments, the 2D bounding box $B_2$ may be an area of another shape (e.g., an irregular shape which fits the bed O) in the image I that is shown as a box of the shape with a frame of other form (e.g., solid line frame).

Figure 5A:
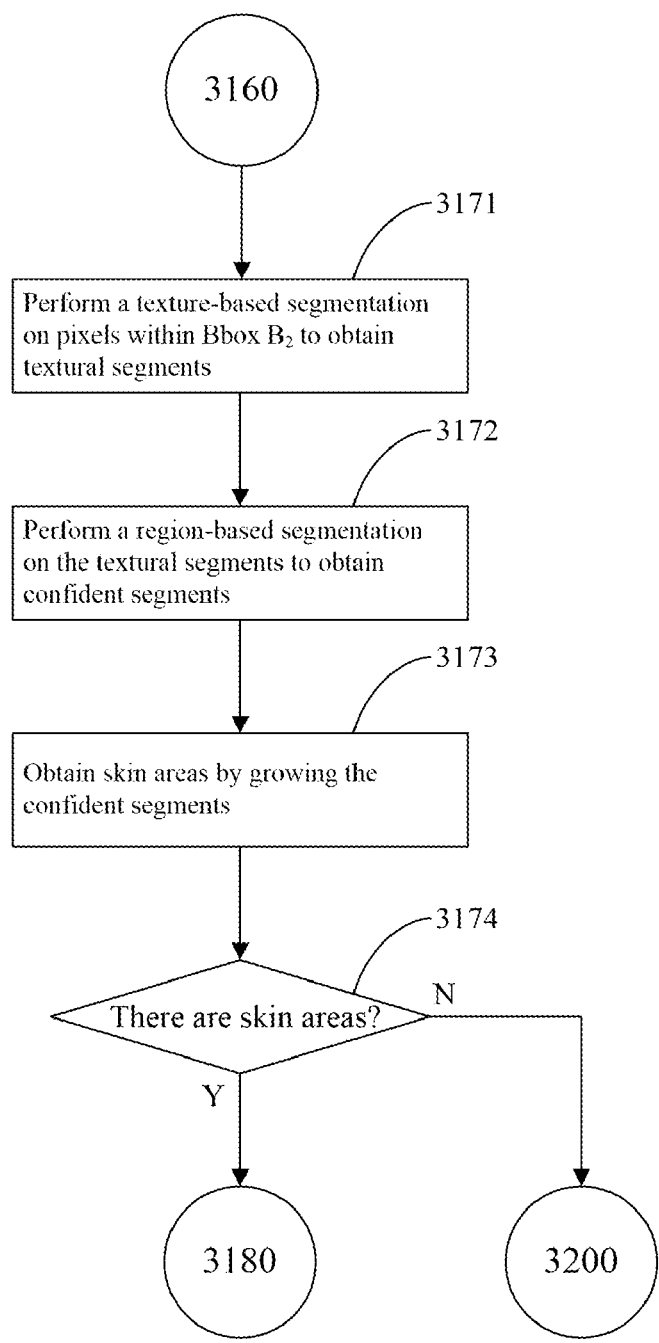
FIG. 5A is a flow chart of an example of detecting skin areas in the human lying posture detection method of FIG. 1A.
Figure 5B:
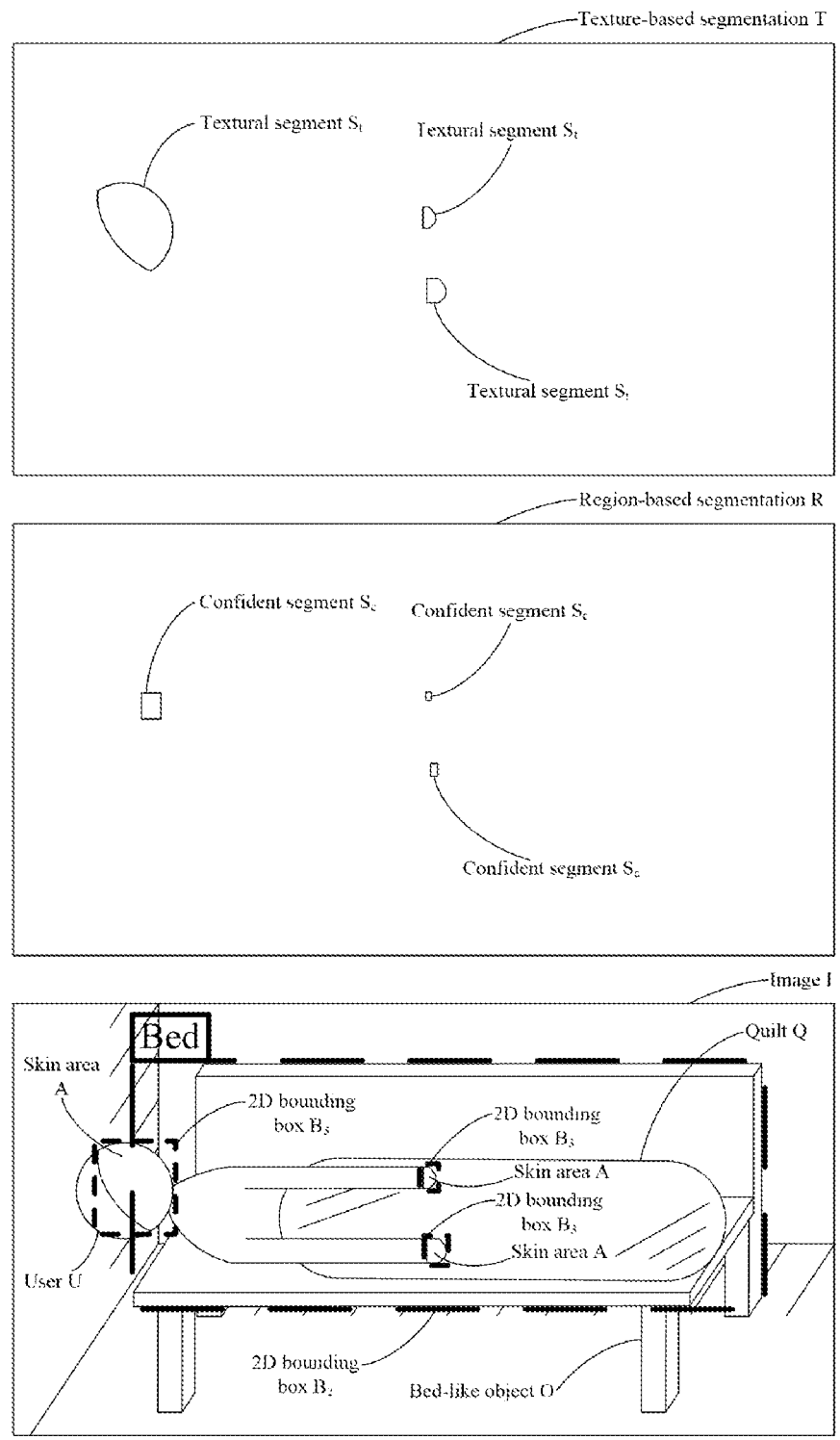
FIG. 5B is a schematic diagram of detecting skin areas in the human lying, posture detection method of FIG. 1A.

At step 3170, a determination is made whether or not there are skin areas A in the image I. The skin areas A may be detected from all pixels of the image I. The skin areas A in the image I are detected using a skin detection algorithm which may be a CV (computer vision) algorithm, and in-house developed architectures that contain a plurality of layers, so as to learn to perform classification tasks directly from the inputted image I, thereby detecting the skin areas A in the image I. FIG. 5A is a flow chart of an example of detecting the skin areas A in the human lying posture detection method of FIG. 1A; and FIG. 5B is a schematic diagram of detecting the skin areas A in the human lying posture detection method of FIG. 1A. Steps 3171-3174 implements the above-mentioned Skin detection algorithm. Accordingly, at step 3171, a texture-based segmentation is performed on all the pixels within the image to obtain textural segments $S_t$. The texture-based segmentation may be performed based on the threshold of pixels value in the (hue, saturation, value) color map for human skin. In the texture-based segmentation T of the upper part of FIG. 5B, each textural segment $S_t$ represents an area of the potential pixels for human skin. At step 3172, a region-based segmentation is performed on the textural segments $S_t$ to obtain confident segments $S_c$. The confident segments $S_c$ of human skin is obtained by calculating the similarity between segment textural segment $S_t$. The confident segments $S_c$ are generally smaller than that the textural segments $S_t$. In the region-based segmentation R of the middle part of FIG. 5B, the confident segments $S_c$ are smaller than that. the corresponding textural segments $S_t$. At step 3173, the skin areas A is obtained by growing the confident segments $S_c$. The skin area A may be obtained by taking the corresponding confident segment $S_c$ as the seed and applying a watershed algorithm to grow the confident segments $S_c$ into the skin area A. At step 3174, a determination is made whether or not there are skin areas A in the image I. It may determine that there are skin areas A in the image I if at least two skin areas A have been obtained. If it is determined that there are skin areas A in the image I, step 3180 will be performed; otherwise, step 3200 will be performed.

At step 3180, skin area 2D bounding boxes $B_3$ are generated using the above-mentioned skin detection algorithm so as to mark the skin areas A. In the image I of the lower part of FIG. 5B, the skin area 2D bounding box $B_3$ is a rectangular area in the image I that is shown as a rectangular box with a dashed line frame to mark the user U. In other embodiments, the skin area 2D bounding boxes $B_1$ may be an area of another shape (e.g., an irregular shape which fits the skin area A) in the image I that is shown as a box of the shape with a frame of other form (e.g., solid line frame). At step 3190, a determination is made whether or not the skin area 2D bounding boxes $B_3$ corresponding to the skin areas A and the 2D bounding box $B_2$ meet a predetermined positional relationship. In some embodiments, the predetermined positional relationship is that at least a part of each skin area 2D bounding box $B_3$ corresponding to all the skin areas A is within the 2D bounding box $B_2$, that is, all the skin area 2D bounding boxes $B_3$ are within the 2D bounding box $B_2$, or each of the skin area 2D bounding boxes $B_3$ is entirely or has a part within the 2D bounding box $B_2$, which covers the case that a part of the body (e.g., the head, the arm, the hand, the leg, or the foot) of the user U strengths beyond the edge of the bed O.

If it is determined that the skin area 2D bounding boxes $B_3$ corresponding to the skin areas A and the 2D bounding box $B_2$ meet the predetermined positional relationship, step 3150 will be performed; otherwise, step 3200 will be performed. For instance, in the image I of the lower part of FIG. 5B, because the entirety of the skin area 2D bounding boxes $B_3$ corresponding to the skin areas A of the hands of the user U and a part of the skin area 2D bounding boxes $B_3$ corresponding to the skin areas A of the face of the user U are within the 2D bounding box $B_2$, it will be determined that the skin area 2D bounding boxes $B_3$ corresponding to the skin areas A and the 2D bounding box $B_2$ meet the predetermined positional relationship, and step 3150 will be performed. At step 3200, the human (i.e., the user U) is determined as not in the lying posture. In some embodiments, in the human lying posture detection method, a time-window may be added for filtering out the invalid results to realize a more accurate and robust detection by, for example, determining the user U as in the lying posture after a plurality of adjacent frames (i.e., the images I) within the time-window are obtained and the user U in all the images I are all determined as in the lying posture. It should be noted that the size of the time-window can be defined according to actual needs (e.g., the preference of the user).

Figure 6A:
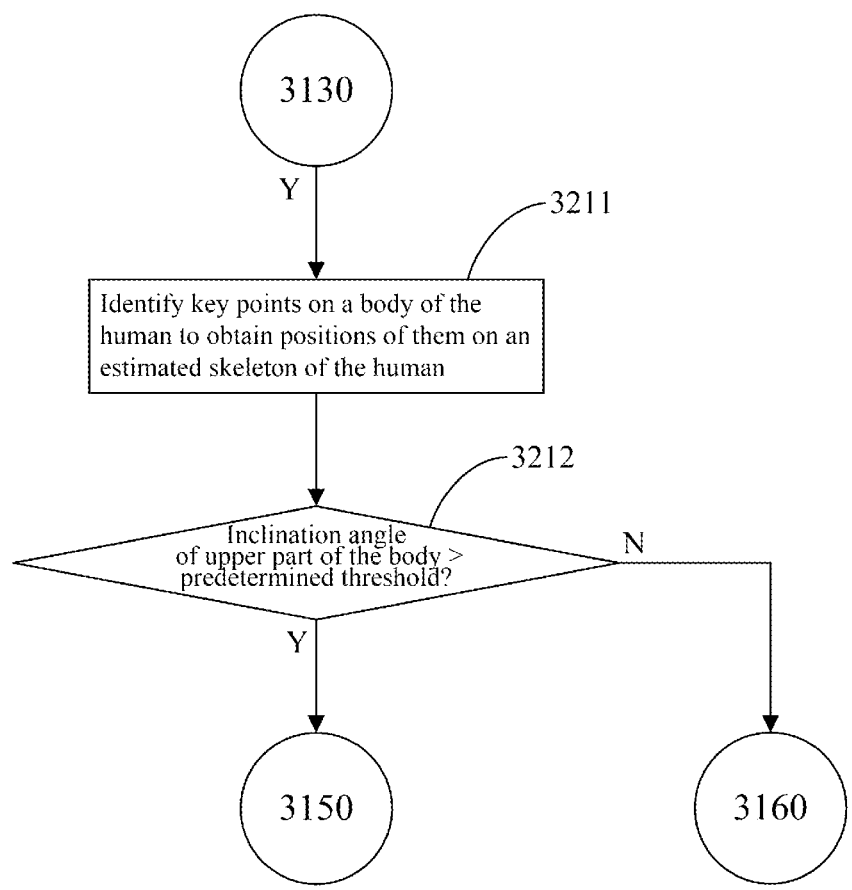
FIG. 6A is a flow chart of an example of using skeleton-based posture detection in the human lying posture detection method of FIG. 1A.
Figure 6B:
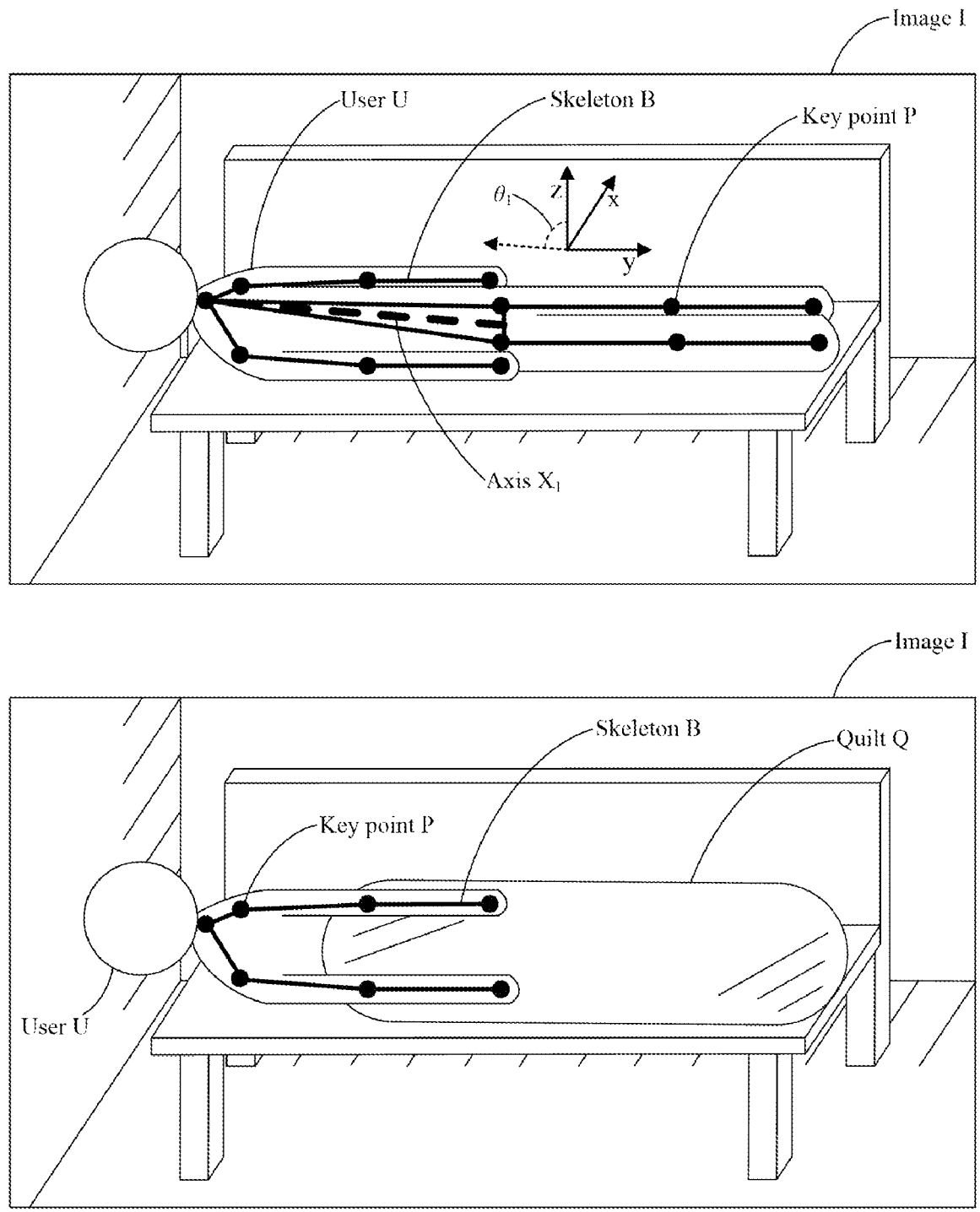
FIG. 6B is a schematic diagram of a result of skeleton based posture detection corresponding to a lying human in the human lying posture detection method of FIG. 6A.
Figure 6C:
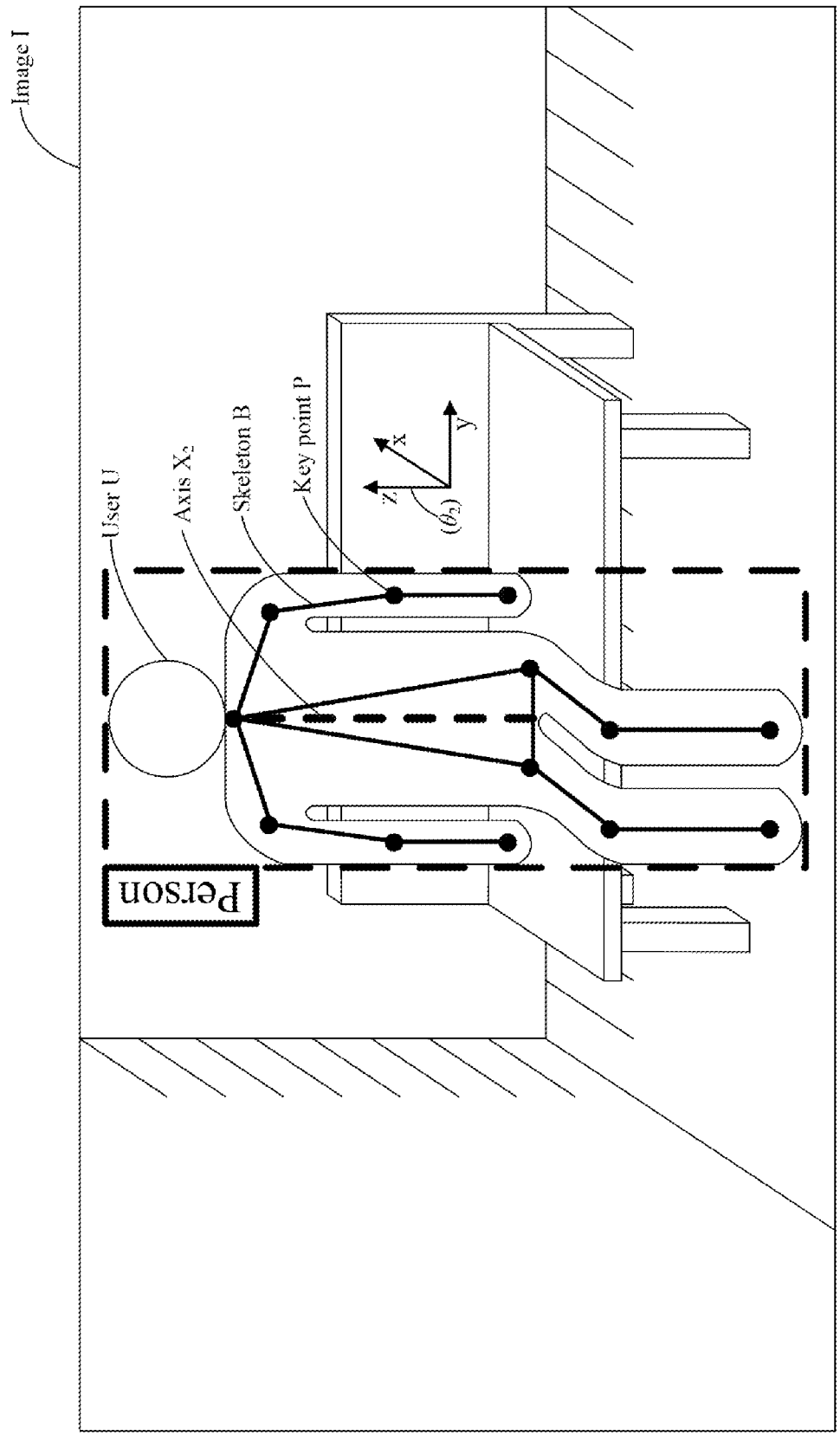
FIG. 6C is a schematic diagram of a result of skeleton based posture detection corresponding to a sitting human in the human lying posture detection method of FIG. 6A.

In some embodiments, skeleton-based posture detection may also be used in the human lying posture detection method, which can provide a more accurate lying posture detection when enough key points can be detected, and may further used to provide a more comprehensive human posture detection (e.g., providing a human posture detection that further detects standing posture and sitting posture of the user U in addition to lying posture of the user U). FIG. 6A is a flow chart of an example of using skeleton-based posture detection in the human lying posture detection method of FIG. 1A; FIG. 6B is a schematic diagram of a result of skeleton based posture detection corresponding to a lying human in the human lying posture detection method of FIG. 6A; and FIG. 6C is a schematic diagram of a result of skeleton based posture detection corresponding to a sitting human in the human lying posture detection method of FIG. 6A. Step 3211 and step 3212 that are for performing skeleton-based posture detection may be performed after it is determined that there is a human in the image I (step 3130).

Accordingly, at step 3211, key points P on a body of the human (i.e., the user U) are identified to obtain positions of the key points P on an estimated skeleton B of the human. In the image I of the upper part of FIG. 6B, since the entirety of the body of the user U who is lying down is shown in the image I, the positions of the key points P on the estimated skeleton B of the entirety of the body of the user U are obtained. In the image I of the lower part of FIG. 6B, since only a part of the body (i.e., the head, the neck, a part of the trunk, the two arms and the two hands) of the user U who is lying down and covered by the quilt Q is shown in the image I, only the positions of the key points P on the estimated skeleton B of the part of the body of the user U are obtained. In the image I of FIG. 6C, since the entirety of the body of the user U who is sitting is shown in the image I, the positions of the key points P on the estimated skeleton B of the entirety of the body of the user U are obtained. At step 3212, a determination is made whether or not an inclination angle θ (e.g., the angle $θ_1$ in the image I of the upper part of FIG. 6B and the angle $θ_2$ in the image I of FIG. 6C) of an upper part of the body (i.e., the upper body angle) of the human (i.e., the user U) is larger than a predetermined angle. The upper part of the body may be the trunk. The predetermined angle (e.g., 60°) is the smallest inclination angle θ of the upper part of the body when the user U is in the lying posture. The inclination angle θ of the upper part of the body of the user U is determined based on the positions of the key points P on the estimated skeleton B of the human by, for example, estimating an axis X (e.g., the axis $X_1$ in the image I of the upper part of FIG. 6B and the axis $X_2$ in the image I of FIG. 6C) of the upper part of the body based on the positions of the key points P corresponding to the neck and the hip of the body and taking an included angle between the axis X and the z axis of the coordinate system of the camera C as the inclination angle θ. If it is determined that the inclination angle θ of the upper part of the body of the user U is larger than the predetermined angle, step 3150 will be performed; otherwise, step 3160 or step 3200 will be performed. For instance, in the case that the predetermined angle is 60', in the image I of the upper part of FIG. 6B, because the angle $θ_1$ of the upper part of the body is larger than 60°, step 3150 will be performed; and in the image I of FIG. 6C, because the angle $θ_2$ (which is 0° because of overlapping with the z axis of the coordinate system of the camera C) of the upper part of the body is smaller than 60°, step 3160 will be performed.

The human lying posture detection method combines the detection of furniture and human skin, which is capable of detecting the lying posture of the user U in the case that the key points can be identified are not enough. The human lying posture detection method can be realized in a real-time manner while only a few computation resources are need, and is economic and efficient because only a depth camera rather than a plurality of sensors are need for detection. In the case that the mobile machine 100 is a mobility aid robot, it can realize the human lying posture detection method to detect the lying posture of the user U and choose a suitable way to interact with the user U accordingly. For example, when the user U is an old person who is detected as having lied down in bed, the mobile machine 100 can ask the user U to sit first before providing further aids.

It can be understood by those skilled in the art that, all or part of the method in the above-mentioned embodiment(s) can be implemented by one or more computer programs to instruct related hardware. In addition, the one or more programs can be stored in a non-transitory computer readable storage medium. When the one or more programs are executed, all or part of the corresponding method in the above-mentioned embodiment(s) is performed. Any reference to a storage, a memory, a database or other medium may include non-transitory and/or transitory memory. Non-transitory memory may include read only memory (ROM), programmable ROM (PROM), electrically programmable ROM (EPROM), electrically erasable programmable ROM (EEPROM), flash memory, solid-state drive (SSD), or the like. Volatile memory may include random access memory (RAM), external cache memory, or the like.

The processing unit 110 (and the above-mentioned processor) may include central processing unit (CPU), or be other general purpose processor, digital signal processor (DSP), application specific integrated circuit (ASIC), field-programmable gate array (FPGA), or be other programmable logic device, discrete gate, transistor logic device, and discrete hardware component. The general purpose processor may be microprocessor, or the processor may also be any conventional processor. The storage unit 120 (and the above-mentioned memory) may include internal storage unit such as hard disk and internal memory. The storage unit 120 may also include external storage device such as plug-in hard disk, smart media card (SMC), secure digital (SD) card, and flash card.

The exemplificative units/modules and methods/steps described in the embodiments may be implemented through software, hardware, or a combination of software and hardware. Whether these functions are implemented through software or hardware depends on the specific application and design constraints of the technical schemes. The above-mentioned human lying posture detection method and mobile machine 100 may be implemented in other manners. For example, the division of units/modules is merely a logical functional division, and other division manner may be used in actual implementations, that is, multiple units/modules may be combined or be integrated into another system, or some of the features may be ignored or not performed. In addition, the above-mentioned mutual coupling/connection may be direct coupling/connection or communication connection, and may also be indirect coupling/connection or communication connection through some interfaces/devices, and may also be electrical, mechanical or in other forms.

The above-mentioned embodiments are merely intended for describing but not for limiting the technical schemes of the present disclosure. Although the present disclosure is described in detail with reference to the above-mentioned embodiments, the technical schemes in each of the above-mentioned embodiments may still be modified, or some of the technical features may be equivalently replaced, so that these modifications or replacements do not make the essence of the corresponding technical schemes depart from the spirit and scope of the technical schemes of each of the embodiments of the present disclosure, and should be included within the scope of the present disclosure.

What is claimed is:

1. A computerized detection method, comprising:
providing a mobile machine comprising a depth camera and a processor, wherein the processor is electrically coupled to the depth camera;
navigating, through the processor, the mobile machine, and obtaining, through the depth camera, at least an image;
detecting, through processor, objects in the image, and marking the objects in the image using 2D bounding boxes, by a deep learning model, wherein the deep learning model is trained using labeled data for detection of a human and labeled data for detection of a bed;
determining, through the process, whether one of the objects in the image is detected as the human by the deep learning model, and whether a width and a height of the 2D bounding box of the human meets a predetermined condition, wherein the 2D bounding box of the human is outputted by the deep learning model;
in response to one of the objects in the image being detected as the human by the deep learning model, and the width and the height of the 2D bounding box of the human meeting the predetermined condition, determining, through the processor, the human being in a lying posture;

in response to one of the objects in the image not being detected as the human by the deep learning model, or the width and height of the 2D bounding box of the human not meeting the predetermined condition, determining, through the processor, whether another one of the objects in the image is detected as the bed by the deep learning model;

in response to another one of the objects in the image being detected as the bed by the deep learning model, detecting, through the processor, one or more skin areas in the image and generating skin area 2D bounding boxes to mark each of the one or more skin areas using a skin detection algorithm;

determining, through the processor, the human being in the lying posture in response to the skin area 2D bounding boxes and the 2D bounding box of the bed meeting a predetermined positional relationship; and controlling, through the processor, the mobile machine to interact with the human according to a way corresponding to the human being in the lying posture.

2. The method of claim 1, wherein the detecting, through the processor, the one or more skin areas in the image and generating skin area 2D bounding boxes to mark each of the one or more skin areas using the skin detection algorithm comprises:

performing, through the processor, a texture-based segmentation on all the pixels within the image to obtain one or more textural segments;

performing, through the processor, a region-based segmentation on the one or more textural segments to obtain one or more confident segments;

obtaining, through the processor, the one or more skin areas according to the one or more confident segments using a watershed algorithm; and generating, tgh the the skin area 2D bounding box to mark each of the one or more skin areas using the skin detection algorithm.

3. The method of claim 1, wherein the predetermined positional relationship comprises: all the skin area 2D bounding boxes being within the 2D bounding box of the bed, or each of the skin area 2D bounding boxes being entirely or having a part within the 2D bounding box of the bed.

4. The method of claim 1, wherein the 2D bounding box of the human is an area of an irregular shape which fits the human, each of the skin area 2D bounding boxes is an area of an irregular shape which fits a skin area, and the 2D bounding box of the bed is an area of an irregular shape which fits the bed; and wherein the width of the 2D bounding box of the human is represented by an eigen vector of the 2D bounding box of the human in a horizontal direction, and the height of the 2D bounding box of the human is represented by another eigen vector of the 2D bounding box of the human in a vertical direction.

5. The method of claim 1, before the determining, through the processor, the human being in the lying posture, further comprising:

in response to one of the objects in the image being detected as the human, identifying, through the processor, key points on a body of the human to obtain positions of the key points on an estimated skeleton of the human;

determining, through the processor, an inclination angle of an upper part of the body of the human determined based on the positions of the key points on the estimated skeleton of the human; and determining, through the processor, the human as in the lying posture in response to the inclination angle of the upper part of the body of the human being larger than a predetermined angle; and in response to the inclination angle of the upper part of the body of the human being not larger than the predetermined angle, determining, through the processor, the human as in the lying posture in response to the width and the height of the 2D bounding box of the human meeting the predetermined condition.

6. The method of claim 1, further comprising:

in response to none of the objects in the image being detected as the bed, having not detected the one or more skin areas, or the skin area 2D bounding box corresponding to the one or more skin areas and the 2D bounding box of the bed not meeting the predetermined positional relationship, determining, through the processor, the human as not in the lying posture; and wherein the human is determined as in the lying posture, after a plurality of adjacent frames within a time-window are obtained and the human in all the images of the adjacent frames are all determined as in the lying posture.

7. The method of claim 1, wherein the mobile machine further comprises an audio circuit electrically coupled to the processor, and the mobile machine is controlled to interact with the human using the audio circuit in response to the human being in the lying posture.

8. A mobile machine, comprising:
a depth camera;
one or more processors; and
a memory storing one or more programs configured to be executed by the one or more processors, wherein the one or more programs include instructions to:

navigate the mobile machine, and obtain, through the depth camera, at least an image;

detect objects in the image, and mark the objects in the image using 2D bounding boxes, by a deep learning model, wherein the deep learning model is trained using labeled data for detection of a human and labeled data for detection of a bed;

determine whether one of the objects in the image is detected as the human by the deep learning model, and whether a width and a height of the 2D bounding box of the human meets a predetermined condition, wherein the 2D bounding box of the human is outputted by the deep learning model;

in response to one of the objects in the image being detected as the human by the deep learning model, and the width and the height of the 2D bounding box of the human meeting the predetermined condition, determine the human being in a lying posture;

in response to one of the objects in the image not being detected as the human by the deep learning model, or the width and height of the 2D bounding box of the human not meeting the predetermined condition, determine whether another one of the objects in the image is detected as the bed by the deep learning model;

in response to another one of the objects in the image being detected as the bed by the deep learning model, detect one or more skin areas in the image and generate skin area 2D bounding boxes to mark each of the one or more skin areas using a skin detection algorithm;

determine the human being in the lying posture in response to the skin area 2D bounding boxes and the 2D bounding box of the bed meeting a predetermined positional relationship; and control the mobile machine to interact with the human according to a way corresponding to the human being in the lying posture.

9. The mobile machine of claim 8, the detecting the one or more skin areas in the image and generating skin area 2D bounding boxes to mark each of the one or more skin areas using the skin detection algorithm comprises:

performing a texture-based segmentation on all the pixels within the image to obtain one or more textural segments;

performing a region-based segmentation on the one or more textural segments to obtain one or more confident segments;

obtaining the one or more skin areas according to the one or more confident segments; and generating the skin area 2D bounding box to mark each of the one or more skin areas using the skin detection algorithm.

10. The mobile machine of claim 8, wherein the predetermined positional relationship comprises at least a part of each of the skin area 2D bounding boxes corresponding to all the one or more skin areas being within the 2D bounding box of the bed.

11. The mobile machine of claim 8, wherein the width of the 2D bounding box of the human is represented by an eigen vector of the 2D bounding box of the human in a horizontal direction, and the height of the 2D bounding box of the human is represented by another eigen vector of the 2D bounding box of the human in a vertical direction.

12. The mobile machine of claim 8, wherein the one or more programs further include instructions to:

in response to one of the objects in the image being detected as the human, identify key points on a body of the human to obtain positions of the key points on an estimated skeleton of the human;

determine an inclination angle of an upper part of the body of the human determined based on the positions of the key points on the estimated skeleton of the human; and determine the human as in the lying posture in response to the inclination angle of the upper part of the body of the human being larger than a predetermined angle; and in response to the inclination angle of the upper part of the body of the human being not larger than the predetermined angle, determine the human as in the lying posture in response to the width and the height of the 2D bounding box of the human meeting the predetermined condition.

13. The mobile machine of claim 8, wherein the one or more programs further include instructions to:

in response to none of the objects in the image being detected as the bed, having not detected the one or more skin areas, or the skin area 2D bounding box corresponding to the one or more skin areas and the 2D bounding box of the bed not meeting the predetermined positional relationship, determine the human as not in the lying posture.

14. The mobile machine of claim 8, wherein the bed is one of a bed, a couch, a bench, and hammock.

15. A non-transitory computer readable storage medium storing one or more programs, wherein the one or more programs comprise instructions, which when executed by a mobile machine having a depth camera, cause the mobile machine to:

navigate the mobile machine, and obtain, through the depth camera, at least an image;

detect objects in the image, and mark the objects in the image using 2D bounding boxes, by a deep learning model, wherein the deep learning model is trained using labeled data for detection of a human and labeled data for detection of a bed;

determine whether one of the objects in the image is detected as the human by the deep learning model, and whether a width and a height of the 2D bounding box of the human meets a predetermined condition, wherein the 2D bounding box of the human is outputted by the deep learning model;

in response to one of the objects in the image being detected as the human by the deep learning model, and the width and the height of the 2D bounding box of the human meeting the predetermined condition, determine the human being in a lying posture;

in response to one of the objects in the image not being detected as the human by the deep learning model, or the width and height of the 2D bounding box of the human not meeting the predetermined condition, determine whether another one of the objects in the image is detected as the bed by the deep learning model;

in response to another one of the objects in the image being detected as the bed by the deep learning model, detect one or more skin areas in the image and generate skin area 2D bounding boxes to mark each of the one or more skin areas using a skin detection algorithm;

determine the human being in the lying posture in response to the skin area 2D bounding boxes and the 2D bounding box of the bed meeting a predetermined positional relationship; and control the mobile machine to interact with the human according to a way corresponding to the human being in the lying posture.

16. The storage medium of claim 15, the detecting the one or more skin areas in the image and generating skin area 2D bounding boxes to mark each of the one or more skin areas using the skin detection algorithm comprises:

performing a texture-based segmentation on all the pixels within the image to obtain one or more textural segments;

performing a region-based segmentation on the one or more textural segments to obtain one or more confident segments;

obtaining the one or more skin areas according to the one or more confident segments; and generating the skin area 2D bounding box to mark each of the one or more skin areas using the skin detection algorithm.

17. The storage medium of claim 15, wherein the predetermined positional relationship comprises at least a part of each of the skin area 2D bounding boxes corresponding to all the one or more skin areas being within the 2D bounding box of the bed.

18. The storage medium of claim 15, wherein the width of the 2D bounding box of the human is represented by an eigen vector of the 2D bounding box of the human in a horizontal direction, and the height of the 2D bounding box of the human is represented by another eigen vector of the 2D bounding box of the human in a vertical direction.

19. The storage medium of claim 15, wherein the one or more programs further comprise instructions causing the mobile machine to:
- in response to one of the objects in the image being detected as the human, identify key points on a body of the human to obtain positions of the key points on an estimated skeleton of the human;
- determine an inclination angle of an upper part of the body of the human determined based on the positions of the key points on the estimated skeleton of the human; and
- determine the human as in the lying posture in response to the inclination angle of the upper part of the body of the human being larger than a predetermined angle; and
- in response to the inclination angle of the upper part of the body of the human being not larger than the predetermined angle, determine the human as in the lying posture in response to the width and the height of the 2D bounding box of the human meeting the predetermined condition.

20. The storage medium of claim 15, wherein the one or more programs further comprise instructions causing the mobile machine to:
- in response to none of the objects in the image being detected as the bed, having not detected the one or more skin areas, or the skin area 2D bounding box corresponding to the one or more skin areas and the 2D bounding box of the bed not meeting the predetermined positional relationship, determine the human as not in the lying posture.

* * * * *